(12) United States Patent
Malini

(10) Patent No.: US 7,870,943 B2
(45) Date of Patent: Jan. 18, 2011

(54) APPARATUS AND METHOD FOR ORIENTING ARTICLES

(75) Inventor: Massimo Malini, Bologna (IT)

(73) Assignee: Aetna Group S.p.A., Villa Verucchio RN (IT)

( * ) Notice: Subject to any disclaimer, the term of this patent is extended or adjusted under 35 U.S.C. 154(b) by 174 days.

(21) Appl. No.: 12/279,815

(22) PCT Filed: Feb. 14, 2007

(86) PCT No.: PCT/EP2007/001279

§ 371 (c)(1),
(2), (4) Date: Oct. 15, 2008

(87) PCT Pub. No.: WO2007/093400

PCT Pub. Date: Aug. 23, 2007

(65) Prior Publication Data

US 2009/0218193 A1    Sep. 3, 2009

(30) Foreign Application Priority Data

Feb. 16, 2006   (IT) .............................. MO06A0054

(51) Int. Cl.
*B65G 47/244*   (2006.01)
(52) U.S. Cl. ................. 198/376; 198/395; 198/401; 53/544
(58) Field of Classification Search ............. 198/376, 198/377.07–377.1, 395, 401; 53/544
See application file for complete search history.

(56) References Cited

U.S. PATENT DOCUMENTS

| | | | |
|---|---|---|---|
| 4,164,281 A * | 8/1979 | Schnier | 198/394 |
| 4,428,474 A * | 1/1984 | Gau et al. | 198/394 |
| 4,653,628 A | 3/1987 | Claypool et al. | |
| 5,291,720 A | 3/1994 | Lashyro et al. | |
| 6,199,680 B1 * | 3/2001 | Sakai et al. | 198/419.2 |
| 6,279,722 B1 * | 8/2001 | Bankuty et al. | 198/395 |
| 7,364,029 B2 * | 4/2008 | Seidel | 198/376 |

FOREIGN PATENT DOCUMENTS

| | | |
|---|---|---|
| EP | 0 323 780 | 7/1989 |
| EP | 1 486 439 | 12/2004 |
| FR | 2 708 759 | 2/1995 |
| GB | 2 384 765 | 8/2003 |

OTHER PUBLICATIONS

International Search Report for PCT/EP2007/001279, mailed Jun. 20, 2007.

* cited by examiner

*Primary Examiner*—Mark A Deuble
(74) *Attorney, Agent, or Firm*—Nixon & Vanderhye P.C.

(57) ABSTRACT

An apparatus comprises a moving arrangement for supporting and moving along an advance direction a plurality of articles; and orienting units movable along said advance direction and such as to contact and orient the articles by displacing angularly each article around an axis thereof so as to position the articles in respective output positions, the orienting units being such as to maintain the articles in contact with the moving arrangement, a detector being provided for each orienting unit for detecting an initial angular position of a respective article associated thereto and for promoting a desired angular displacement such that each article is brought in the output position.

21 Claims, 6 Drawing Sheets

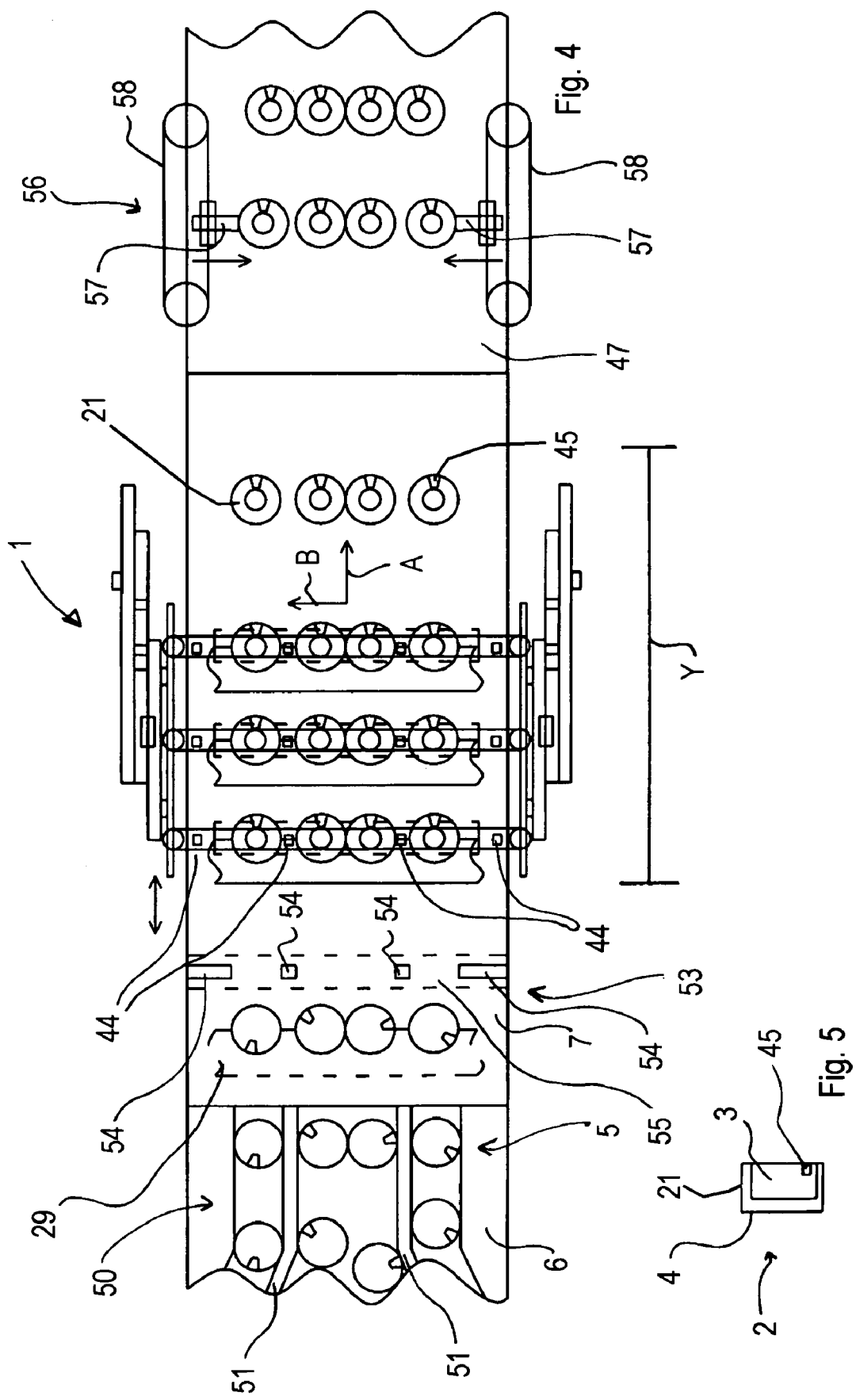

APPARATUS AND METHOD FOR ORIENTING ARTICLES

CROSS-REFERENCE TO RELATED APPLICATIONS

This application is the U.S. national phase of International Application No. PCT/EP2007/001279, filed 14 Feb. 2007, which designated the U.S and claims priority to Italy Application Nos. MO2006A000054, filed 16 Feb. 2006, the entire contents of each application is hereby incorporated by reference.

DESCRIPTION

The invention refers to an apparatus for orienting rotatable articles, such as jars, cans, boxes, bottles or the like.

In particular, the invention refers to an apparatus for angularly orienting in a desired position articles having an external surface provided with distinctive signs of the product contained therein, such as, for example, labels, barcodes, advertising or the like.

In the food distribution industry, it is usual to make packages comprising a plurality of individual articles wrapped by a film of transparent material such as a heat-shrinkable plastic film or the like.

In order to set off the product distinctive signs of the article, improve the presentation thereof and thus increase the advertising impact, the single articles have to be oriented in such a way that the label of each of them is always highly visible to a consumer or in such a way that labels of several consecutive and adjacent articles reproduce a desired pattern, for example the commercial name of the product contained therein.

On the other hand, it may be required to orient the single articles for preventing reading the said distinctive signs, for example barcodes positioned on the articles, in order to promote the reading of the sole barcode of the whole package.

There are known orienting apparatuses, which are usually associated with packaging machines or packaging lines, acting on articles arranged beforehand in rows and columns and conveyed along an advance direction by a conveyor belt, said articles being positioned at a relatively great mutual distance in relation to the dimensions of the articles.

These apparatuses comprise detectors arranged for identifying references provided on the articles to be oriented, such as for example a colour or a graphic sign.

Said apparatuses comprise gripping heads or units which are supported by a slidable carriage positioned above the conveyor belt and moved along the advance direction of the articles, during an orienting phase.

The gripping heads, which are provided with a grasping device for grasping the articles, can be rotated around respective longitudinal axes by means of motors that are electronically linked to the said detectors.

During the orienting phase each article is initially grasped and subsequently lifted from the conveyor belt by the respective grasping device. Each gripping head rotates the respective article until the detector detects said reference and thus the initial angular position of the article. Once the reference has been identified, the detector sends a signal to the motor, which interrupts the rotation of the gripping head when the desired angular position has been achieved angular position. Then the gripping head place the oriented article on the conveyor belt.

In a repositioning phase the carriage moves in a direction opposite the advance direction of the conveyor belt to enable the gripping heads to grasp and orient further articles.

A drawback of the apparatuses disclosed above is the reduced production, i.e. the limited number of articles oriented over the period of time.

In fact, in order to avoid structural breakage due to the significant masses—and therefore inertias—to be lifted, oriented and moved, the gripping heads can lift and orient at the same time a small number of articles, if the apparatus and/or the packaging machine works at high operating speed, or a greater number of articles, if the apparatus and/or the packaging machine works at lower operating speed.

A further drawback of said apparatus is that the grasping devices comprise complex and expensive mechanisms that have to be replaced according to the dimensions of the articles to be oriented. This drawback limits the flexibility of the apparatus and causes prolonged machine downtimes whenever it is necessary to change the article size.

Furthermore, the grasping devices may damage portions of articles with which they come into contact, spoiling aesthetic features thereof.

An object of the invention is to improve known apparatuses for orienting articles that can be rotated, such as jars, cans, boxes, bottles or the like.

A further object is to provide an apparatus capable to orient a great number of articles over the time unit so as to increase the overall production of the apparatus and any packaging machine associated therewith.

A still further object is to obtain a flexible and versatile apparatus that make possible to orient articles of different dimensions and sizes, with short machine downtimes for adjustments.

Another object is to provide an orienting apparatus, which interact delicately with the articles to be rotated, so as to preserve aesthetic features thereof.

In a first aspect of the invention an apparatus is provided comprising a moving arrangement for supporting and moving along an advance direction a plurality of articles, and orienting units movable along said advance direction and such as to contact and orient said articles by displacing angularly each article around an axis thereof so as to position said articles in respective output positions, said orienting units being such as to maintain said articles in contact with said moving arrangement, a detector being provided for each orienting unit for detecting an initial angular position of a respective article associated thereto and promoting a desired angular displacement such that each article is brought in said output position.

Owing to this aspect of the invention it is possible to obtain an apparatus that orients articles, arranged side by side on one or more rows transverse to the advance direction, while they are conveyed by the moving arrangement with continuous motion. In this way, a great number of articles can be oriented in the unit of time and it can be increased the overall production of the apparatus and the packaging machine which can be associated thereto.

The orienting units owing to their structure and configuration can orient articles of different dimensions and sizes. The orienting units can be easily and quickly adjusted along a direction that is transverse to the said advance direction.

The orienting units are provided with a contacting element for mating upper portions of the said articles, said contacting element being replaceable, according to the dimensions of the articles to be oriented, in a rapid and simple manner, with short machine downtimes.

The orienting units do not remove and lift the articles but press the latter against the moving arrangement, rotating the articles so as to orient them in the required output positions. The orienting units can be moved at relatively high speed and acceleration, in order to increase an operating speed of the apparatus, since they have small mass and do not support and convey the articles.

Furthermore, owing to the structure of the contacting element that comprises, for example, pads or suction cups, the orienting units interacts delicately with the articles to be rotated, preserving aesthetic features thereof.

In a second aspect of the invention there is provided a method comprising supporting and conveying a plurality of articles along an advance direction, contacting and orienting said articles by means of orienting units arranged for displacing angularly each article around an axis thereof so as to position said articles in respective output positions, during said contacting there being provided moving said orienting units along said advance direction substantially at the same height of said conveying, said orienting comprising detecting, by means of a detector provided for each orienting unit, an initial angular position of a respective article associated thereto and promoting a desired angular displacement such that each article is brought in said output position.

The invention can be better understood and implemented with reference to the attached drawings that illustrate some embodiments thereof by way of non-limiting example, in which:

FIG. 4 is a schematic top view of an embodiment of the apparatus;

FIG. 5 is a schematic view of an article to be oriented;

Figure 1:
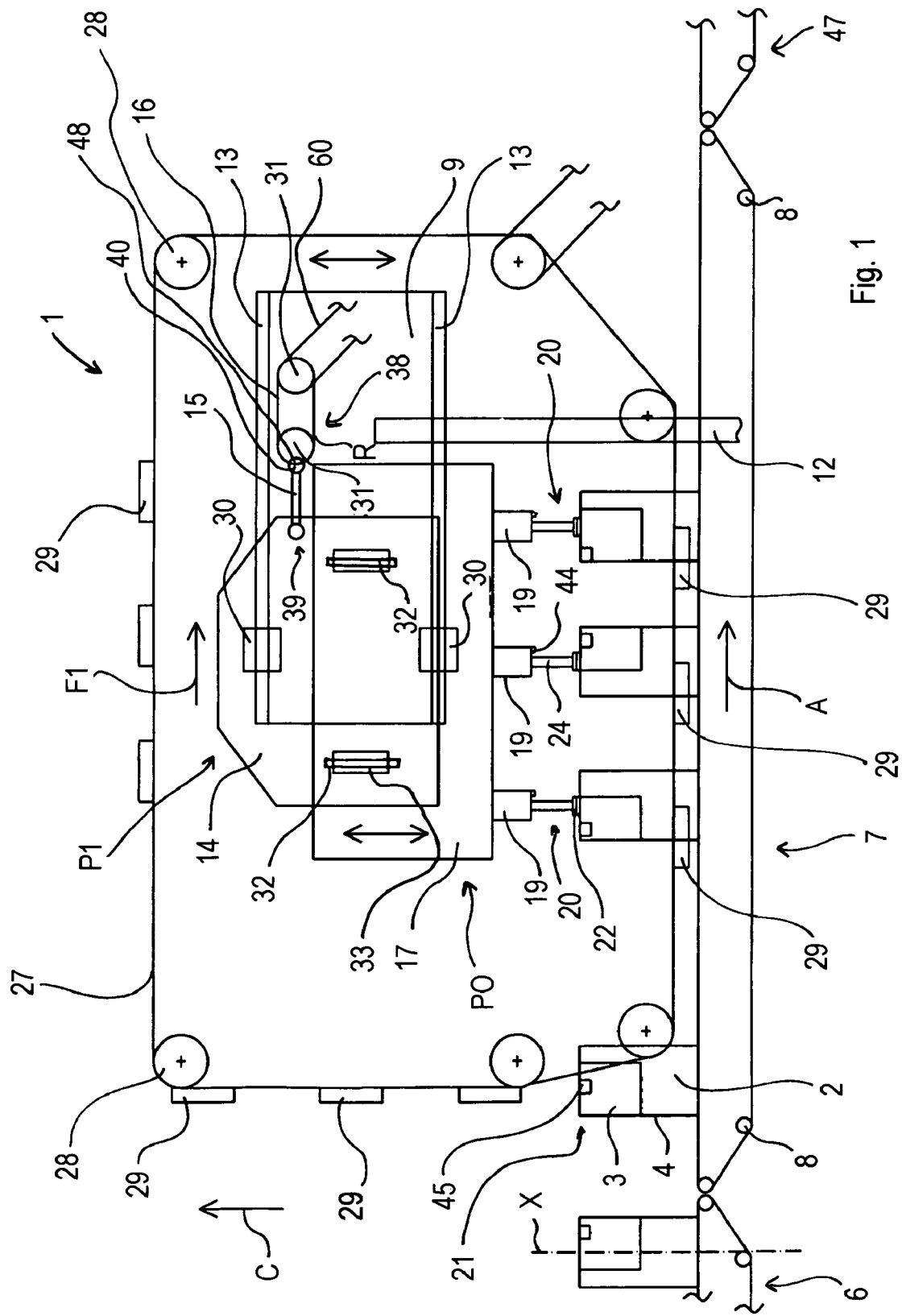
FIG. 1 is a front schematic view of the orienting apparatus of the invention in a first operating position.
Figure 2:
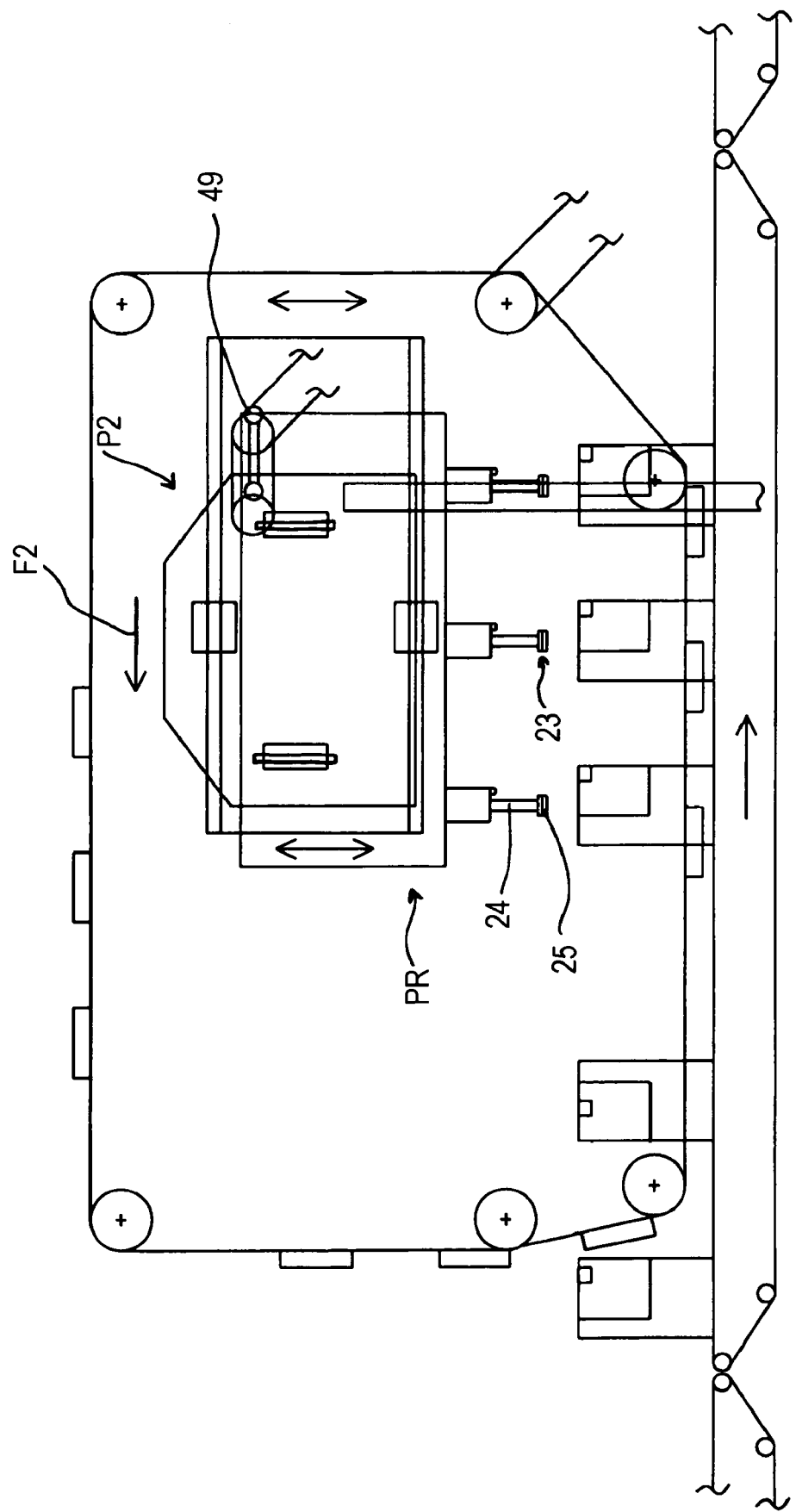
FIG. 2 is a front schematic view of the orienting apparatus in FIG. 1 in a second operating position.
Figure 3:
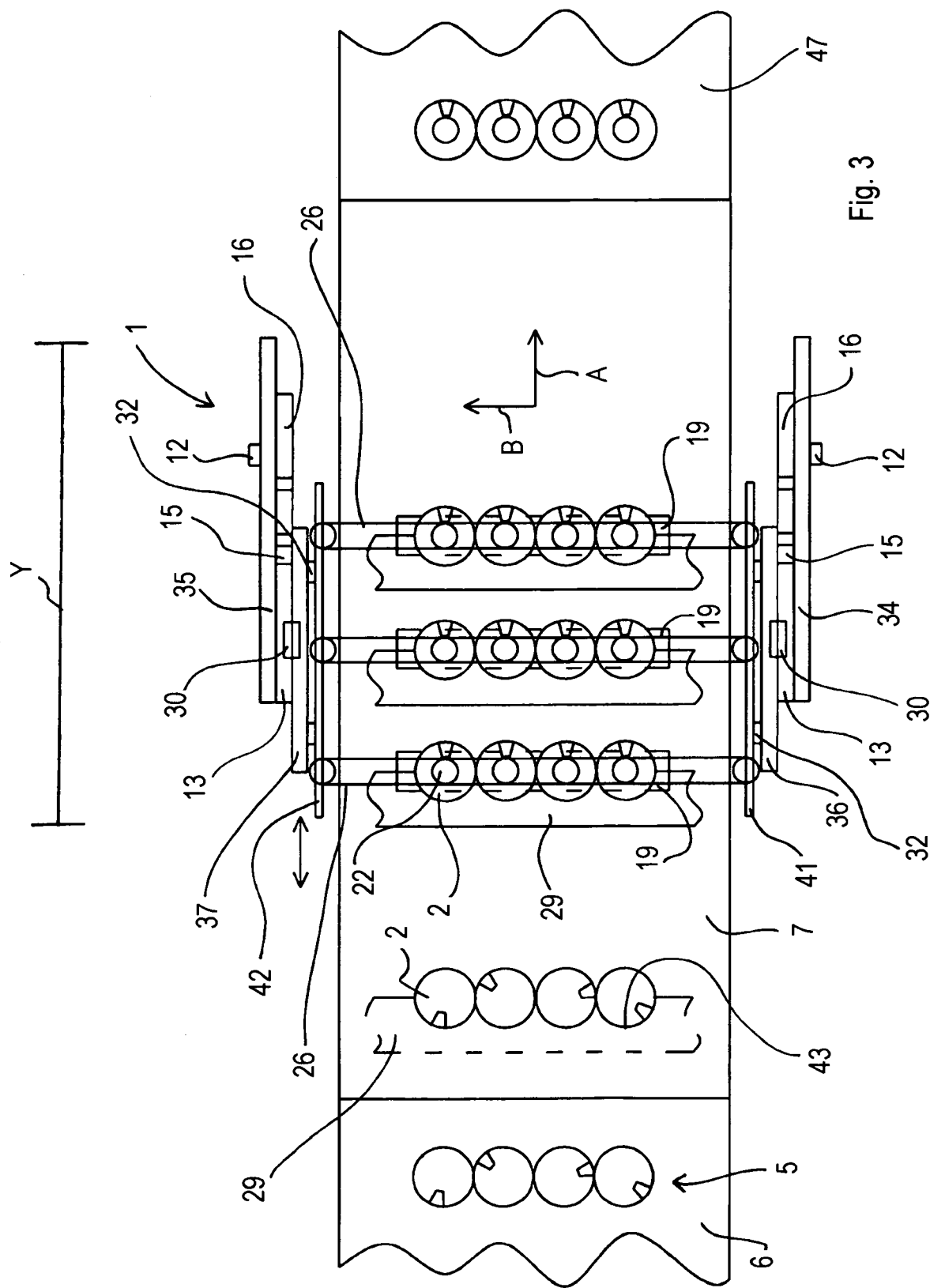
FIG. 3 is a schematic top view of the apparatus in FIG. 1.

With reference to FIGS. 1 to 3, an apparatus 1 is shown for angularly orienting articles 2 that are rotatable around a longitudinal axis X, substantially vertical. The articles 2, such as for example cans, bottles, jars, boxes or similar, have a respective external surface 4 provided with distinctive signs which identify an article content, for example labels 3, barcodes, advertising or the like.

The labels 3 can be made of paper and therefore glued to the external surface 4, or can be obtained directly on the latter through moulding, painting or similar methods.

The apparatus 1 is arranged, in particular, for orienting the articles 2 in such a way that said labels 3 are clearly visible to a consumer, or in such a way that labels 3 of a plurality of consecutive and adjacent articles 2 reproduce a desired pattern, for example a commercial name of the product contained in the articles 2.

The articles 2 can be ordered next to one another in rows 5 (FIG. 3) that are suitably spaced apart from one another along an advance direction A of the articles 2, each row 5 extending along a transverse direction B that is horizontal and transverse, for example substantially perpendicular, to the advance direction A.

The apparatus 1 may comprise a loading belt 6, extending and movable with continuous motion along the advance direction A at a pulling speed $V_C$. The loading belt 6 can be part of a packaging machine with which the apparatus of the invention can be associated.

Loading belt 6 is arranged for supporting and conveying the rows 5 of articles 2 towards a moving arrangement of the apparatus 1, which comprises an endless moving belt 7, wound around pulleys 8 and substantially coplanar with the loading belt 6.

Unlike the loading belt 6, the moving belt 7 is made of low-friction coefficient material for enabling easy orienting of the articles 2 and extends and is slidable with continuous motion along the advance direction A at an advancing speed $V_A$. In an embodiment of the apparatus that is not shown in the figures, the moving arrangement 7 comprises a conveyor of known type, such as a conveying chain, arranged for supporting and moving supporting elements, such as trays, layers, cardboard sheets, on which the articles to be oriented are positioned, arranged side-by-side along one ore more rows. This conveyor is movable along the advance direction A at a speed equal to the pulling speed $V_C$ of the loading belt 6. Advancing speed $V_A$ of moving belt 7 is slightly lower than pulling speed $V_C$ of loading belt 6, so as to reduce the pitch between two consecutive rows 5 of articles 2 once the latter are transferred from said loading belt 6 to said moving belt 7.

The apparatus 1 comprises a frame 9, which extends substantially parallel to the advance direction A and comprises first plates 34, 35, mutually facing and positioned above and lateral to the moving belt 7.

A height of first plates 34, 35 is adjustable according to the size of articles 2 to be oriented by means of respective positioning elements 12. The first plates 34, 35 are provided with longitudinal guides 13 that extend substantially parallel to the advance direction A.

Frame 9 is arranged for supporting a first carriage 14, which comprises mutually facing second plates 36, 37, each plate provided with first sliding blocks 30 that are slidable along said longitudinal guides 13.

In this way the first carriage 14 is slidable along the advance direction A.

Second plates 36, 37 are moved along the advance direction A by respective further moving arrangement 38.

Further moving arrangement 38 comprises a respective tie rod 15, or the like, having a first end 39, which is connected to one of second plates 36, 37 and a second end 40, which is opposite the first end 39 and connected to a transmission element 16 comprising, for example, a chain or an endless timing belt, mounted around sprockets 31 associated with first plates 34, 35. The chain 16 is connected to a main motor through a further transmission element 60, which comprises for example chains or timing belts. The main motor is the motor of the apparatus 1 or the motor of the packaging machine associated with the apparatus.

The chain 16 moves the tie rod 15 along a loop path R between a first dead centre 48 and a second dead centre 49 defining respectively an initial position P1 and a final position P2 for the first carriage 14. In particular, between the first dead centre 48 and the second dead centre 49 there are defined a forward stroke, in which the tie rod 15 is moved from the first dead centre 48 to the second dead centre 49 and a return stroke, in which the tie rod 15 is moved from the second dead centre 49 to the first dead centre 48. In other words, during the forward stroke the first carriage 14 is moved at pulling speed $V_C$, above a portion of length Y of moving belt 7 (FIG. 3) in the direction indicated by the first arrow F1, from the initial position P1 to the final position P2, in an orienting phase of the articles 2. During the return stroke the first carriage 14 is moved at the pulling speed $V_C$, above the length portion Y of the moving belt 7, in the direction indicated by the second arrow F2 from the final position P2 to the initial position P1, in a repositioning phase of the orienting apparatus 1.

In an embodiment of the invention that is not shown in figures, further moving arrangement 38 comprises an independent actuator element that consists, for example, of a rotating brushless motor or a linear electric motor. The rotating motor can moves the chain 16 or can move directly the first carriage 14 through the transmission element comprising, for example, a rack element or a screw element. The linear electric motor can be directly coupled to the first carriage 14. The second plates 36, 37 of first carriage 14 are further provided with vertical guides 32 extending along a lifting direction C that is substantially vertical and perpendicular to the advance direction A.

The first carriage 14 is arranged for supporting a second carriage 17 which comprises third plates 41, 42 that are mutually facing and are provided with second sliding blocks 33 that are slidable along said vertical guides 32.

The second carriage 17 is moved along the vertical guides 32 by an actuating element, which is not shown, such as for example pneumatic pistons and/or a linear cam, between a lowered operating position PO (FIG. 1) and a raised rest position PR (FIG. 2), as better disclosed below.

The second carriage 17 is arranged for sustaining supporting elements 19 that are substantially parallel and extend along the transverse direction B.

Each supporting element 19 is arranged for supporting a plurality of orienting units or heads 20, for example four in number, projecting from the latter towards the moving belt 7.

The orienting units 20 are arranged one after the other along the supporting elements 19 and are suitably spaced from one another so as to rotate a respective article 2.

Figure 6:
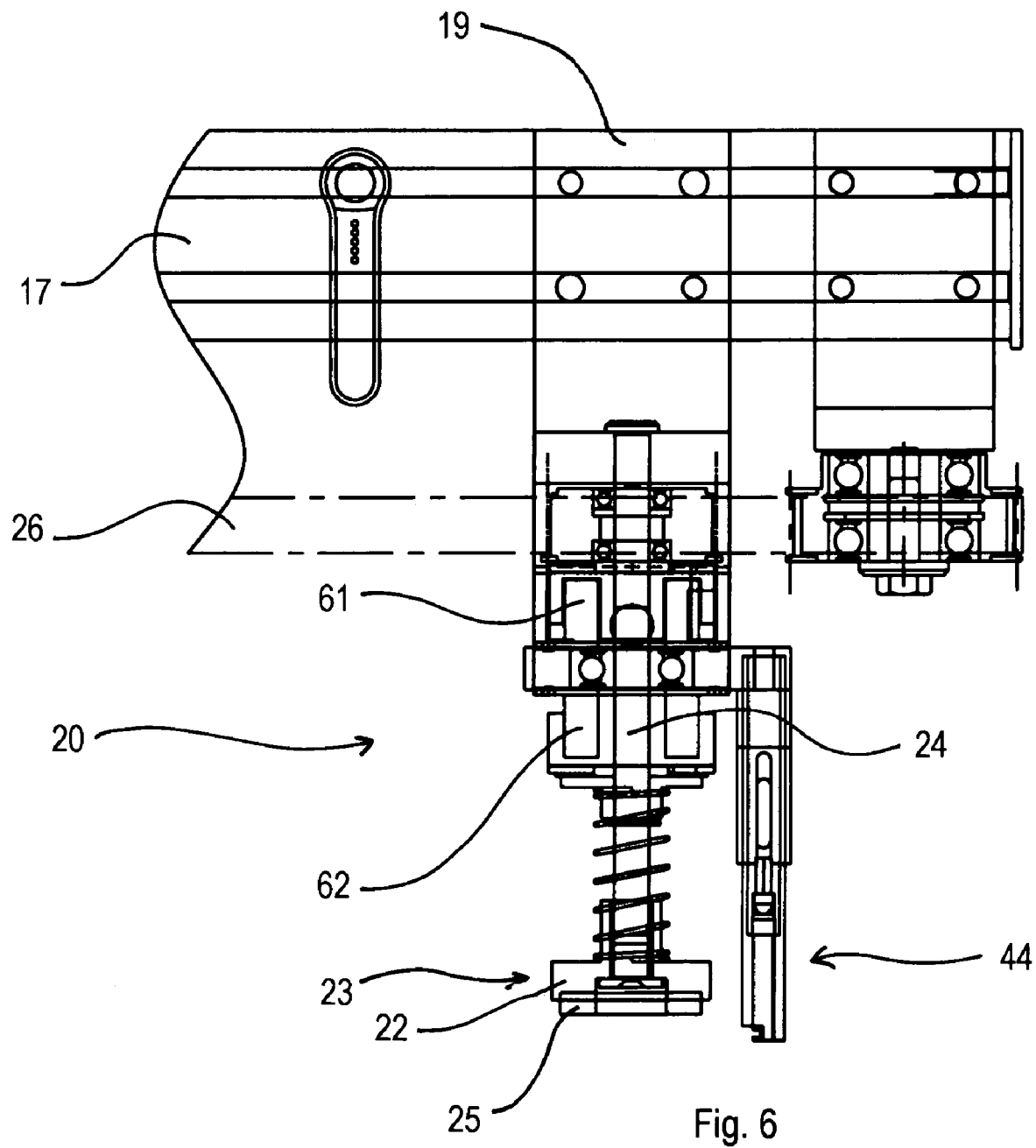
FIG. 6 is a partial and enlarged view of an orienting unit of the apparatus in FIG. 1.

With reference to FIG. 6, an orienting unit 20 is illustrated that extends along the lifting direction C and having a shaft 24, which is provided at an end 23 with a contacting element 22 comprising a pad arranged to abut on an upper portion 21 of articles 2.

The pad 22 is provided with a plate 25, made of rubber or another material with a high friction coefficient, arranged for contacting with friction the upper portion 21, so as to press the article 2 against the moving belt 7.

In an embodiment of the invention that is not shown in figures, the contacting element of each orienting unit 20 comprises one or more vacuum cups connected to a vacuum source and arranged for contacting said upper portion 21.

In a further embodiment of the invention, which is not shown, the contacting element of each orienting unit 20 comprises a grasping device of known type, such as for example grippers, arranged for grasping said upper portion 21.

When the second carriage 17 is positioned in the operating position PO, the plate 25 of pad 22 is in contact with the upper portion 21. Then, as better disclosed below, the shaft 24 is rotated, and as the friction coefficient between the article 2 and moving belt 7 is lower than the friction coefficient between the plate 25 and the upper portion 21, it is possible to rotate the article 2.

Each shaft 24 is rotated through a flexible driving arrangement, for example belts 26 driven by a single motor, which is not shown. In this way it is possible to drive simultaneously all the orienting units 20 using a single motor, with consequent financial benefit.

Alternatively, it is possible to provide each operating unit 20 with a respective motor.

Each operating unit 20 is also provided with an engaging/disengaging element 61, for example a clutch, and a brake 62 for stopping the rotation of the unit.

Each orienting unit 20 is provided with a detector 44 arranged for detecting references 45 provided on the articles 2, such as, for example a defined coloured area or a countermark or a graphic reference printed on the label 3.

The detector 44 comprises an optical sensor, of known type, capable to detect the reference 45 and send a corresponding signal to an electronic control device, of known type and not illustrated, of the apparatus.

If such reference 45 is positioned on the upper portion 21 of the article 2 it is possible to mount the detector 44 on the corresponding orienting unit 20 upstream or downstream of said advance direction A (FIG. 1).

The moving arrangement of orienting apparatus 1 further comprises a pulling belt 27, mounted on a fixed frame, which is not shown.

The endless pulling belt 27, which is wound around further pulleys 28, is movable with continuous motion along the advance direction A at the pulling speed $V_C$, and is positioned above the moving belt 7 in such a way as to face the latter.

The pulling belt 27 is provided with crossbars 29 extending along the transverse direction B, regularly spaced apart from one another in such a way as to interact with respective rows 5 of articles 2.

The crossbars 29 are provided with a plurality of seats 43, which are suitably spaced and shaped so as to engage respective articles 2.

Since crossbars 29 move at the pulling speed $V_C$, while articles 2 move on the moving belt at the advancing speed $V_A$, which is lower than pulling speed $V_C$, it is ensured that crossbars 29 abut on articles 2 during advancing along the advance direction A, moving them at the pulling speed $V_C$ along the length portion Y of the moving belt 7. This enables to precisely define and maintain the position of articles 2 along the transverse direction B during a movement thereof.

The orienting apparatus 1 is further provided with an unloading belt 47, positioned downstream of the moving belt 7. Said unloading belt 47 extends along the advance direction A and slides with continuous motion at the pulling speed $V_C$.

The unloading belt 47, which is substantially coplanar with the moving belt 7, for example is arranged for conveying the articles 2 to a machine packaging station, which is not shown, arranged for wrapping the articles 2, suitably grouped and with the labels 3 arranged according to a desired orientation, with a transparent plastics film, i.e. a heat-shrinkable plastic film.

The operation of the orienting apparatus 1 is disclosed below with particular reference to FIGS. 1 to 3.

In an initial phase, the first carriage 14 is positioned in the initial position P1, the second carriage 17 is in the rest position PR, and the orienting units 20 are maintained stationary by the respective engaging/disengaging element whilst the drive belts 26 rotate.

Subsequently, rows 5 of suitably spaced articles 2 are positioned on the loading belt 6.

The loading belt 6, which slides at pulling speed $V_C$, conveys the rows 5, for example in groups of three, on the moving belt 7, which is positioned downstream of the loading belt 6 and slides at the advancing speed $V_A$ that is lower than the pulling speed $V_C$. In such a way, the pitch between two consecutive rows 5 of articles 2 is decreased.

Then each row 5 is moved along the advance direction A at the advancing speed $V_A$ until it is engaged by a respective crossbar 29, which moves along the pulling belt 27 at the pulling speed $V_C$.

The speed difference between the moving belt 7 on which the articles 2 are positioned and the crossbars 29 ensures that each crossbar 29 abuts with the respective seats 43 on the articles 2.

The crossbars 29 thus pull the articles 2 of the rows 5 with continuous motion at the pulling speed $V_C$ along the moving belt 7, in such a way that each row 5 is below a corresponding row of orienting units 20.

Then the actuating element moves the second carriage 17 from the rest position PR to the operating position PO.

In the operating position PO the engaging/disengaging element is deactivated so as to allow rotating the plates 25 of orienting units 20 that abut on the upper portions 21 of articles 2. At the same time, the orienting units 20 are moved in the advance direction A along the length portion Y of moving belt 7 at the same speed as the articles 2 on the moving belt 7.

In this way, as the friction coefficient between the article 2 and the moving belt 7 is less than the friction coefficient between the plate 25 and the upper portion 21, it is possible to rotate the articles 2.

It should be noted that from the operating position PO and while the articles 2 are being oriented, the first carriage 14 and therefore the orienting units 20 are moved along the advance direction A in the direction indicated by the arrow F1 at the pulling speed $V_C$ from the initial position P1 to the final position P2 by means of the tie rod 15 that is movable along the forward stroke.

Each orienting unit 20 rotates the article 2 associated thereto so that the corresponding detector 44 can detect the reference 45, namely an initial angular position of the article 2. When this occurs, the detector 44 sends a signal to the control device of the apparatus, which operates the orienting unit 20 so as to perform a desired angular displacement for displacing the article 2 in the required output or final position. In other words, control device of the apparatus calculates when to operate the engaging/disengaging element 61 and the brake 62 of the respective shaft 24 so as to stop the rotation of the latter and consequently to arrest the corresponding article 2 in the respective output position.

It should be noted that articles 2 are oriented while the first carriage 14 moves between the initial position P1 and the final position P2 along the length portion Y of the moving belt 7.

When the first carriage 14 is positioned in the final position P2, the second carriage 17 is moved by the actuating element from the operating position PO to the rest position PR, in which the plates 25 are lifted and spaced from the upper portion 21.

Afterwards, tie rod 15 moves the first carriage 14 and the orienting units 20 from the final position P2 to the initial position P1 in such a way that they can orient following rows 5 of articles 2.

When the articles 2 have been displaced angularly in the desired output position, the rows 5 are released one after the other by the respective crossbars 29, and directed by the moving belt 7 to the unloading belt 47 that conveys said rows 5 towards the packaging station.

With reference to FIGS. 4 and 5 an alternative embodiment of the orienting apparatus 1 is shown which is arranged for orienting articles 2 (FIG. 4) provided with references 45 positioned at any point of the external surface 4.

In this embodiment of the invention, a height of each detector 44 is adjustable according to the position of said references 45, the detector 44 being positioned on vertical supports, not shown, which are fixed to supporting elements 19 and spaced from one another along the transverse direction B. Each detector 44 associated to a respective orienting unit 20 is positioned at the side thereof so as to face an external surface 4 of an article 2.

In a further embodiment of the invention, shown in FIG. 6, each detector 44 is mounted on the respective orienting unit 20 at the side thereof a in such a way as not to interfere with the articles 2 moving along the advance direction A.

In this configuration, the detector 44 can be movable along the lifting direction C between a retracted position, wherein it is spaced from the article 2, and an extended position, wherein it can detect the reference 45.

The articles 2 are ordered in rows 5 extending along the transverse direction B, suitably spaced by means of a spacer unit 50, which is positioned on the loading belt 6 and is provided with separating elements 51, for example fixed guides.

The orienting apparatus 1 comprises a detecting device 53 positioned on the moving belt 7 upstream of the orienting units 20 with respect to the advance direction A, said detecting device 53 being arranged for detecting a position of articles 2 along the transverse direction B and for stopping the apparatus 1 in the case of incorrect alignment of articles 2. This is necessary to avoid that wrongly aligned articles 2 may hit and damage the detectors 44.

The detecting device 53 comprises a plurality of bars 54 that are rotatable around horizontal axes and supported by a fixed transverse element 55, shown by a dotted line in FIG. 4, which extends along the transverse direction B. The bars 54 are spaced apart from one another according to the arrangement of the articles 2 on each row 5. In this way, after the articles of a row 5 have been engaged by a respective crossbar 29 shaped so as to maintain the articles 2 spaced at a desired distance that is defined by the separating elements 51, it is possible to detect possible incorrect positioning of articles 2 with respect to the crossbars 29. If an article 2 is incorrectly positioned, said article 2 hits a respective bar 54, which consequently moves so as to activate a sensor that instantaneously stops the operation of the apparatus 1.

The apparatus 1 further comprises a compacting unit 56 arranged for compacting the rows 5 along a direction transverse to the advance direction A, that is the transverse direction B. The compacting unit 56 can be positioned on the unloading belt 47 so as to receive rows 5 of oriented articles 2 exiting the moving belt 7.

The compacting unit 56 comprises pushers 57 that are movable along a the transverse direction B, and mounted on respective belts 58 that are slidable at the same pulling speed $V_C$ of the unloading belt 47. In this way, the pushers 57 transmit to the articles 2 only a motion component, which is substantially parallel to the transverse direction B so as not to modify the orientation of articles. The single rows 5 of articles 2 so compacted can be subsequently wrapped in packs having a 1×n pattern, where n is the number of article of the single row 5.

In an embodiment of the invention, which is not shown in figures, the pushers 57 are provided with compacting elements that are movable along the advance direction A at a speed that is sufficient for compacting the rows 5 also along this direction so as to form a group or pack of articles 2 having a desired size. In this way, it is possible to compacted articles 2 so as to form "multipacks", to be subsequently wrapped, having a m×n pattern, where m is the number of columns and n the number of rows.

It should further be noted that loading belt 6, moving belt 7, unloading belt 47 and pulling belt 27 can also be moved by a main motor drive of the apparatus 1 or of the packaging machine, through a suitable transmission element.

Figure 7:
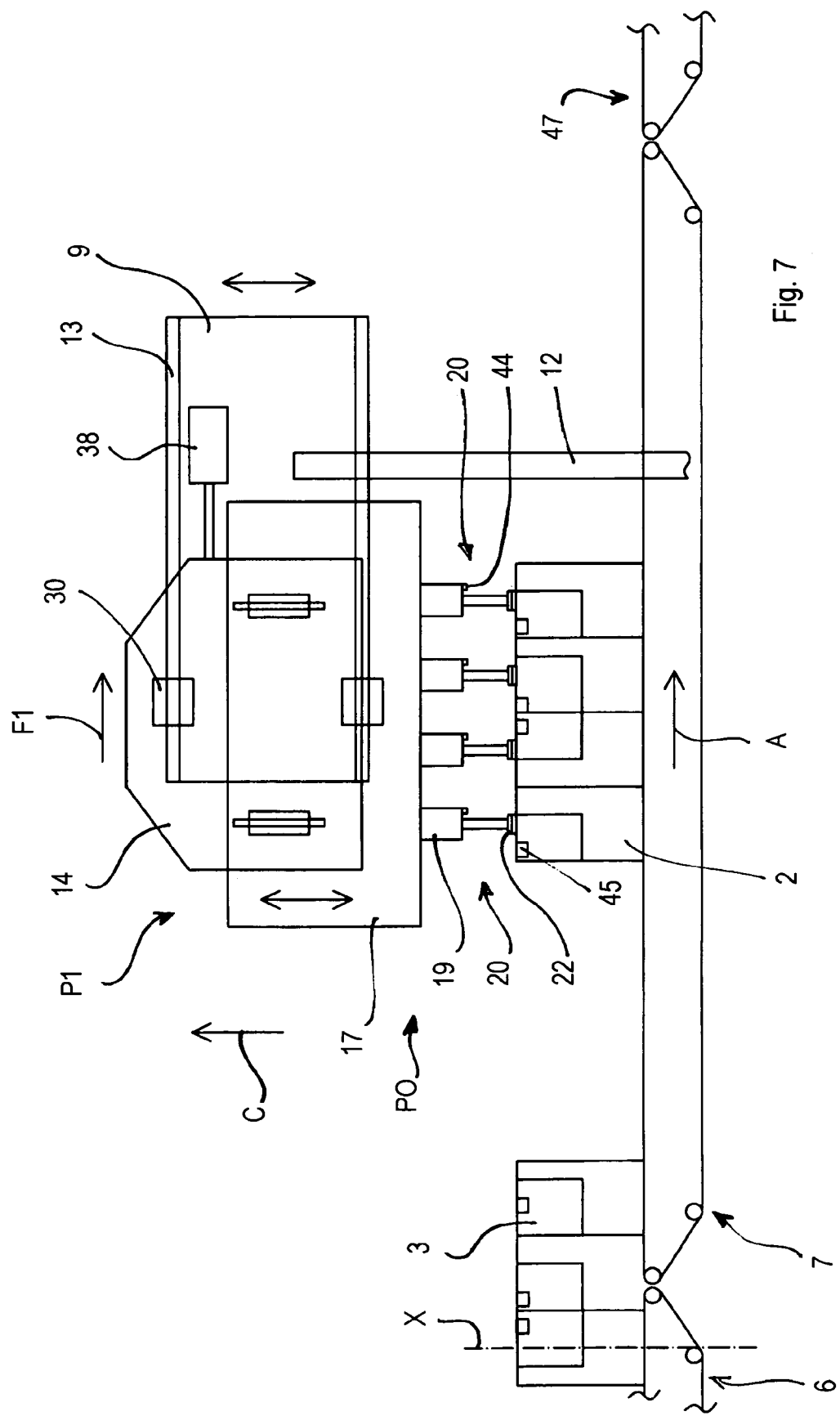
FIG. 7 is front schematic view of a further embodiment of the apparatus.

With reference to FIG. 7, a further embodiment of the apparatus 1 comprises a plurality of orienting units 20 mounted on the supporting elements 19 of second carriage 17 so as to orient at the same time a plurality of adjacent rows 5 of articles 2. In particular, the pitch between the adjacent supporting elements 19 is substantially equal to a diameter of article 2. Likewise, the distance between two adjacent orienting units 20 on the same supporting element 19 is substantially equal to said article diameter. This arrangement of the orienting units 20 allows obtaining at the exit of the moving arrangement 7, groups of articles 2 already compacted along the advance direction A and along the transverse direction B, so as to form "multipacks" having a "m×n" pattern. Thus, the compacting unit 56 is not required anymore.

The articles 2 of each pack can be angularly oriented so as to have, for example, the respective label 3 facing outwards or forming particular patterns.

As show in FIG. 7, the orienting apparatus 1 can be provided with a moving arrangement that does not comprise the pulling belt 27 having the crossbar 28 for moving the articles 2. The articles 2 can be moved in fact by the moving belt 7, which in this case slides in the advance direction A at a speed equal to the pulling speed $V_c$ of loading belt 6 and unloading belt 47.

The invention claimed is:

1. Apparatus, comprising a moving arrangement for supporting and moving along an advance direction a plurality of articles, and orienting units movable along said advance direction and such as to contact and orient said articles by displacing angularly each article around an axis thereof so as to position said articles in respective output positions, said orienting units being such as to maintain said articles in contact with said moving arrangement, a detector being provided for each orienting unit for detecting an initial angular position of a respective article associated thereto and promoting a desired angular displacement such that each article is brought in said output position, said orienting units being mounted on supporting elements which are associated with a carriage element, said carriage element being slidably associated with a further carriage element that is movable along said advance direction between an initial position and a final position.

2. Apparatus according to claim 1, wherein said moving arrangement comprises a belt device for supporting said articles and a further belt device provided with a plurality of crossbars spaced apart from one another and arranged for abutting on said articles.

3. Apparatus according to claim 1, wherein each orienting unit comprises a contacting element for interacting with an upper portion of said articles.

4. Apparatus according to claim 3, wherein said contacting element comprises one in a group including a pad element made of a material having a high friction coefficient, a suction-cup element, a gripping element.

5. Apparatus according to claim 1, wherein each orienting unit is rotated by a respective motor.

6. Apparatus according claim 1, comprising a single motor for rotating said orienting units through a driving arrangement.

7. Apparatus according to claim 1, wherein each orienting unit comprises a locking arrangement for stopping a rotation of said orienting unit.

8. Apparatus according to claim 1, wherein said carriage element is movable between an operating position, wherein said orienting units contact said articles and a rest position (PR), wherein said orienting units are spaced out from said articles.

9. Apparatus according to claim 1, wherein said further carriage element comprises guides for slidably support sliding blocks elements of said carriage element.

10. Apparatus according to claim 1, comprising a frame arranged for slidably supporting said further carriage element.

11. Apparatus according to claim 10, wherein said frame comprises wall elements provided with further guides arranged for slidably supporting further sliding blocks elements of said further carriage element.

12. Apparatus according to claim 10, wherein said frame comprises positioning elements for positioning said wall elements in a desired vertical position.

13. Apparatus according to claim 1, comprising further moving arrangement arranged for moving said further carriage element along said advance direction.

14. Apparatus according to claim 1, wherein each detector is arranged for identifying a reference provided on a respective article, so as to detect said initial angular position thereof and sending a detection signal.

15. Apparatus according to claim 14, comprising a control device for receiving said detection signal and driving the corresponding orienting unit so as to position the article associated thereto in said output position.

16. Apparatus according to claim 1, wherein each detector is mounted on a respective orienting unit.

17. Apparatus according to claim 14, wherein each detector is movable between a retracted position and an extended position, wherein said detector can identify said reference of the respective article.

18. Apparatus according to claim 1, comprising a detecting device positioned upstream said orienting units with respect to said advance direction and arranged for detecting positions of said articles along a direction transverse to said advance direction.

19. Apparatus according to claim 1, comprising a compacting unit for compacting said plurality of articles along said advance direction and/or along a direction transverse to said advance direction, in order to form groups of adjacent articles.

20. Apparatus according to claim 19, wherein said compacting unit comprises pusher elements which are movable along said advance direction and/or along said transverse direction and arranged for contacting and pushing said elements.

21. Apparatus according to claim 1, wherein said articles are arranged on said moving arrangement so as to form rows transverse to said advance direction.

* * * * *